(12) United States Patent
Hattori et al.

(10) Patent No.: US 10,958,476 B2
(45) Date of Patent: Mar. 23, 2021

(54) DATA TRANSMISSION DEVICE AND DATA TRANSMISSION METHOD

(71) Applicant: TOSHIBA MITSUBISHI-ELECTRIC INDUSTRIAL SYSTEMS CORPORATION, Chuo-ku (JP)

(72) Inventors: Keisuke Hattori, Chuo (JP); Tomohisa Ohkami, Chuo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 164 days.

(21) Appl. No.: 16/321,497

(22) PCT Filed: Aug. 23, 2016

(86) PCT No.: PCT/JP2016/074504
§ 371 (c)(1),
(2) Date: Jan. 29, 2019

(87) PCT Pub. No.: WO2018/037476
PCT Pub. Date: Mar. 1, 2018

(65) Prior Publication Data
US 2020/0252238 A1 Aug. 6, 2020

(51) Int. Cl.
*H04L 12/46* (2006.01)
*G05B 19/042* (2006.01)
(Continued)

(52) U.S. Cl.
CPC .......... *H04L 12/46* (2013.01); *G05B 19/042* (2013.01); *H02J 3/36* (2013.01); *H04L 69/08* (2013.01)

(58) Field of Classification Search
CPC ....... H04L 12/46; H04L 69/08; G05B 19/042; H02J 3/36
See application file for complete search history.

(56) References Cited

U.S. PATENT DOCUMENTS 5,706,286 A * 1/1998 Reiman .................. H04L 12/66
370/401
2013/0215765 A1* 8/2013 Benninger ............. H02H 7/261
370/249
(Continued)

FOREIGN PATENT DOCUMENTS

JP 2014-166091 A 9/2014
WO WO 2014/207849 A1 12/2014

OTHER PUBLICATIONS

International Search Report dated Nov. 15, 2016 in PCT/JP2016/074504 filed Aug. 23, 2016.
(Continued)

*Primary Examiner* — Duc C Ho
(74) *Attorney, Agent, or Firm* — Oblon, McClelland, Maier & Neustadt, L.L.P.

(57) ABSTRACT

According to an embodiment of the invention, a data transmission device that includes a communicator and a controller is provided. The communicator is connected to a network and communicates with another device via the network. The controller transmits, from the communicator to the other device, a data set including data of at least one item in the case where the data of the at least one item has changed from the state of previous interval; and the transmitted data set includes the data having the changed state. The controller acquires the data of the at least one item at a first interval, and performs the transmitting of the data set to the other device at a second interval or at a frequency less than the second interval by updating the data of the at least one item at the second interval; and the second interval is slower than the first interval.

7 Claims, 10 Drawing Sheets

(51) Int. Cl.
*H02J 3/36* (2006.01)
*H04L 29/06* (2006.01)

(56) References Cited

U.S. PATENT DOCUMENTS

| | | | |
|---|---|---|---|
| 2014/0025321 A1* | 1/2014 | Spanier | G01R 22/063 |
| | | | 702/62 |
| 2014/0100702 A1* | 4/2014 | Schweitzer, III | G05B 13/02 |
| | | | 700/286 |
| 2014/0244058 A1* | 8/2014 | Zweigle | H02J 13/00002 |
| | | | 700/291 |
| 2016/0204614 A1 | 7/2016 | Itaya | |

OTHER PUBLICATIONS

Japanese Office Action dated Jan. 14, 2020 Japanese Patent Application No. 2018-535959 (with partial unedited computer generated English translation), 6 pages.

Partial Extended European Search Report dated Dec. 17, 2019 in European Patent Application No. 16914150.4, 1 page.

* cited by examiner

DATA TRANSMISSION DEVICE AND DATA TRANSMISSION METHOD

FIELD

Embodiments described herein relate generally to a data transmission device and a data transmission method.

BACKGROUND ART

There is a data transmission device that is mutually connected with another device via a network and automatically transmits a signal to the other device when an event occurs in designated data. For example, devices provided in a transformer substation mutually exchange data based on a protocol conforming to the international standard IEC 61850.

In IEC 61850, it is defined to transmit a GOOSE (Generic Object Oriented Substation Event) signal automatically when a state change (an event) occurs in data included in the GOOSE signal.

Therefore, for a system performing communication using the GOOSE communication function of IEC 61850, the GOOSE signal is transmitted each time the data changes in the case where a signal (e.g., the control value calculated by each device) in which the state constantly changes is included in the GOOSE signal for a device in which the data of the GOOSE signal is updated at an interval shorter than the communication interval required by the system. As a result, the GOOSE signal is transmitted at a higher frequency than necessary; and there is a possibility that the communication load inside the network and/or the signal reception processing in the receiving-side devices may be excessive.

Thus, for example, in a data transmission device automatically transmitting a signal according to an event of designated data such as a device using the GOOSE communication function of IEC 61850, etc., it is desirable for the transmission of the data (the signal) at a higher frequency than necessary to be suppressed.

CITATION LIST

Patent Literature

[PTL 1]
JP-A 2014-166091

SUMMARY OF INVENTION

Problem to be Solved by the Invention

An embodiment of the invention provides a data transmission device and a data transmission method in which the transmission of data at a higher frequency than necessary is suppressed.

Means for Solving the Problem

According to an embodiment of the invention, a data transmission device that includes a communicator and a controller is provided. The communicator is connected to a network and communicates with another device via the network. The controller transmits, from the communicator to the other device, a data set including data of at least one item in the case where the data of the at least one item has changed from the state of previous interval; and the transmitted data set includes the data having the changed state. The controller acquires the data of the at least one item at a first interval, and performs the transmitting of the data set to the other device at a second interval or at a frequency less than the second interval by updating the data of the at least one item at the second interval; and the second interval is slower than the first interval.

Effects of the Invention

According to an embodiment of the invention, a data transmission device and a data transmission method are provided in which the transmission of data at a higher frequency than necessary is suppressed.

MODES FOR CARRYING OUT THE INVENTION

Figure 1:
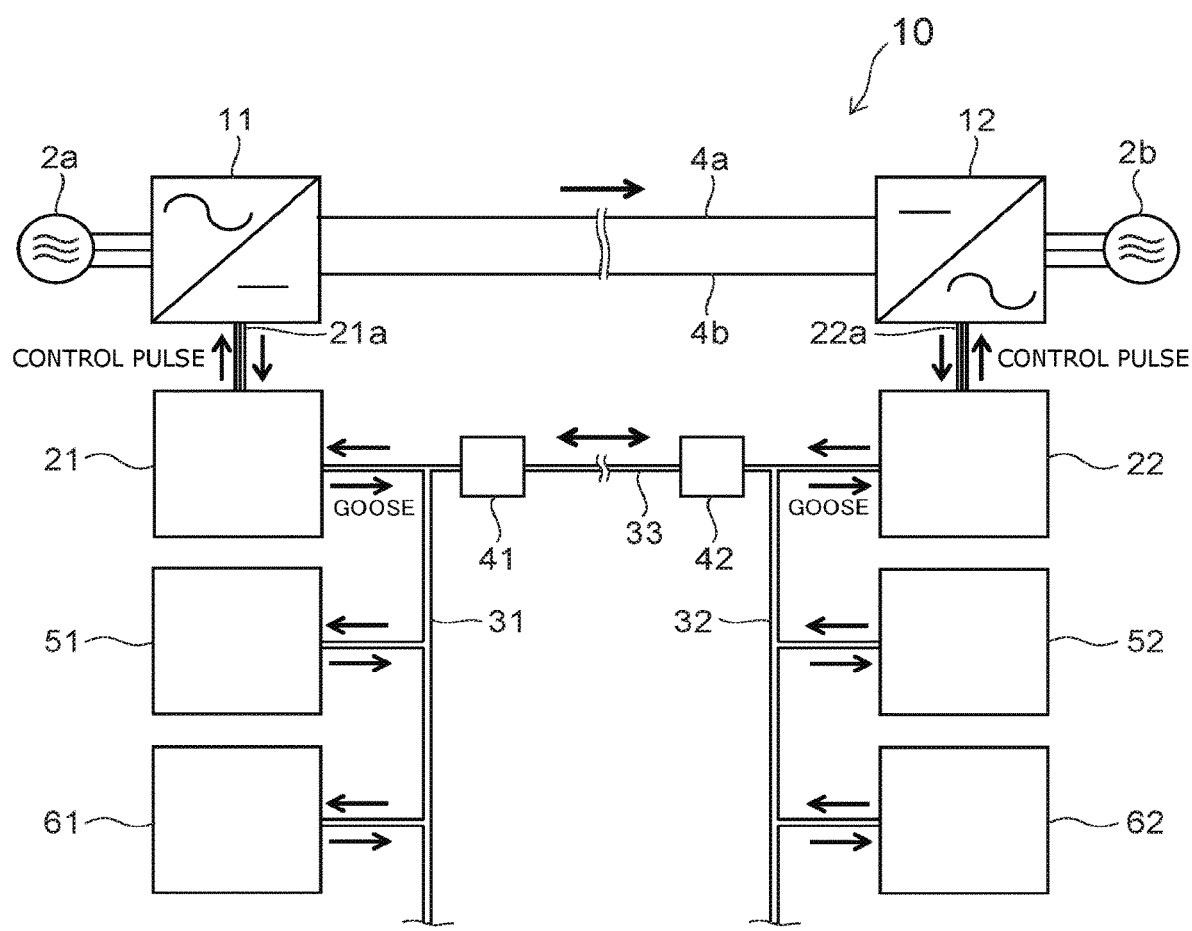
FIG. 1 is a block diagram schematically illustrating a high voltage direct current power transmission system according to a first embodiment.

Embodiments will now be described with reference to the drawings.

The drawings are schematic or conceptual; and the relationships between the thicknesses and widths of portions, the proportions of sizes between portions, etc., are not necessarily the same as the actual values thereof. Further, there are also cases where the dimensions and/or the proportions are illustrated differently between the drawings, even in the case where the same portion is illustrated.

In this specification and each drawing, components similar to ones described in reference to an antecedent drawing are marked with the same reference numerals; and a detailed description is omitted as appropriate.

First Embodiment

FIG. 1 is a block diagram schematically illustrating a high voltage direct current power transmission system according to a first embodiment.

As illustrated in FIG. 1, the high voltage direct current power transmission system 10 includes a first AC-DC converter 11, a second AC-DC converter 12, a first control device 21 (implementing a data communicator), and a second control device 22.

The first AC-DC converter 11 is connected to a first alternating current power system 2a and direct current power lines 4a and 4b. The second AC-DC converter 12 is connected to a second alternating current power system 2b and the direct current power lines 4a and 4b. In other words, the first AC-DC converter 11 and the second AC-DC converter 12 are connected to each other via the direct current power lines 4a and 4b.

The first AC-DC converter 11 converts alternating current power supplied from the first alternating current power system 2a into direct current power and supplies the direct current power to the direct current power lines 4a and 4b. The second AC-DC converter 12 converts the direct current power supplied from the direct current power lines 4a and 4b into alternating current power and supplies the alternating current power to the second alternating current power system 2b.

Thus, in the high voltage direct current power transmission system 10, the alternating current power of the first alternating current power system 2a is converted into direct current power and power transmission is performed; and the direct current power again is returned to alternating current power and supplied to the second alternating current power system 2b. Also, in the high voltage direct current power transmission system 10, contrary to the description recited above, the power transmission also can be performed from the second alternating current power system 2b side to the first alternating current power system 2a side. In other words, the high voltage direct current power transmission system 10 connects the alternating current power systems 2a and 2b via the AC-DC converters 11 and 12.

The alternating current power of the alternating current power systems 2a and 2b is, for example, three-phase alternating current power. For example, each of the AC-DC converters 11 and 12 performs a conversion from three-phase alternating current power to direct current power and performs a conversion from direct current power to three-phase alternating current power. The alternating current power of the alternating current power systems 2a and 2b may be single-phase alternating current power, etc.

The first control device 21 is connected to the first AC-DC converter 11 via a signal line 21a. The first control device 21 controls the conversion of the electrical power by the first AC-DC converter 11. The first AC-DC converter 11 includes, for example, multiple switching elements having a full-bridge connection and performs the AC-DC conversion by controlling the turn ON timing of the switching elements in the case where the first AC-DC converter 11 is a separately-excited converter. For example, the first control device 21 is connected to the switching elements via the signal line 21a and controls the turn ON timing of the switching elements by inputting control pulses to the switching elements. Thereby, the first control device 21 controls the conversion of the electrical power by the first AC-DC converter 11.

Also, the first control device 21 acquires, from the first AC-DC converter 11, various data (feedback values) necessary for the control. For example, the first control device 21 acquires the alternating current voltage value of each phase of the first alternating current power system 2a, the direct current voltage values of the direct current power lines 4a and 4b, the direct current values of the direct current power lines 4a and 4b, etc., from measuring devices inside the high voltage direct current power transmission system 10.

The second control device 22 is connected to the second AC-DC converter 12 via a signal line 22a. Similarly to the first control device 21, the second control device 22 acquires various data from the second AC-DC converter 12 and controls the conversion of the electrical power by the second AC-DC converter 12.

The first control device 21 is connected to a first gateway 41, a first client device 51, a first protection device 61, etc., via a first network 31. The first network 31 is, for example, a LAN (Local Area Network), etc., inside the transformer substation premises where the first AC-DC converter 11, the first control device 21, etc., are installed.

The first client device 51 is, for example, a common control device, a HMI (Human Machine Interface), SCADA (Supervisory Control and Data Acquisition), etc., and is a device positioned at a control layer higher than the first control device 21. For example, the first client device 51 inputs, to the first control device 21, various data necessary to control the first control device 21 such as direct current power command values, an operation mode switch signal, etc. The operation mode switch signal is, for example, a signal for the switching for the forward conversion operation from alternating current to direct current, the reverse conversion operation from direct current to alternating current, etc.

For example, the first protection device 61 inputs a protection request signal to the first control device 21. The protection request signal is, for example, a signal for instructing the execution of a protection operation such as stopping the first AC-DC converter 11, etc., when overcurrent or overvoltage occurs in the direct current power lines 4a and 4b.

For example, the components of the first control device 21, the first network 31, the first gateway 41, the first client device 51, and the first protection device 61 conform to the IEC 61850 standard and mutually exchange data using a communication form conforming to the IEC 61850 standard.

Similarly to the first control device 21, the second control device 22 is connected to a second gateway 42, a second client device 52, a second protection device 62, etc., via a second network 32. The second network 32, the second client device 52, and the second protection device 62 are substantially the same as those described in reference to the first control device 21; and a detailed description is therefore omitted.

The second gateway 42 is connected to the first gateway 41 via a third network 33. In other words, the first control device 21 and the second control device 22 are connected to each other via the networks 31 to 33 and the gateways 41 and 42.

The third network 33 is, for example, a communication line for long-distance communication. For example, the first gateway 41 performs a conversion of protocols, etc., and connects the first network 31 and the third network 33. Similarly, for example, the second gateway 42 performs a conversion of protocols, etc., and connects the second network 32 and the third network 33.

Figure 2:
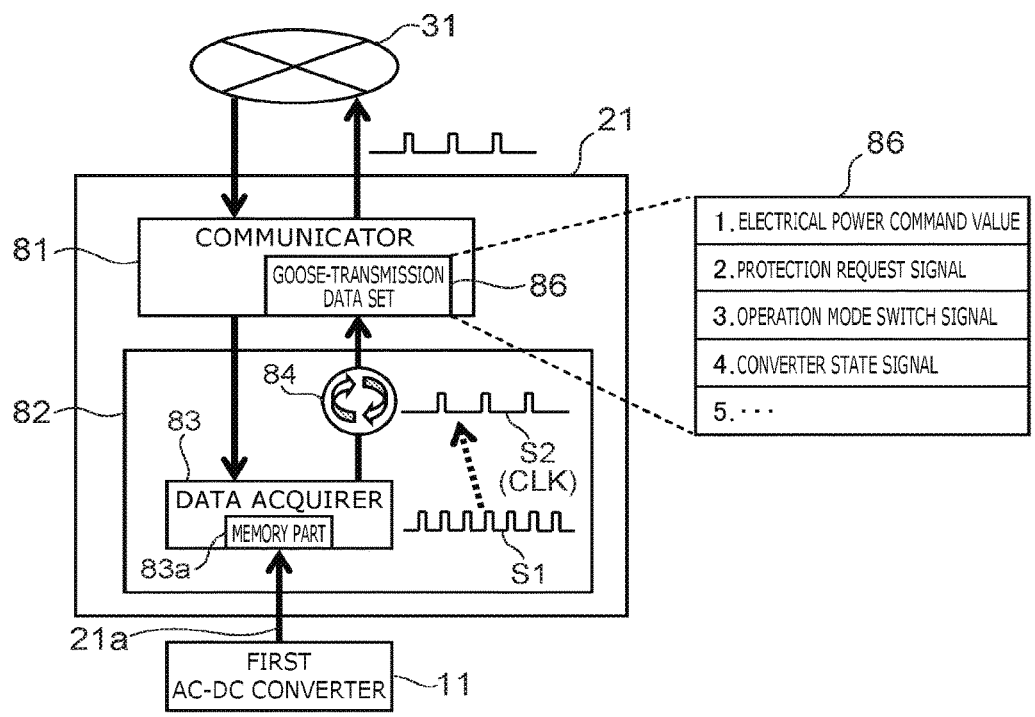
FIG. 2 is a block diagram schematically illustrating the first control device according to the first embodiment.

FIG. 2 is a block diagram schematically illustrating the first control device according to the first embodiment.

As illustrated in FIG. 2, the first control device 21 includes a communicator 81 and a controller 82. Although a detailed description is omitted, the configuration of the second control device 22 is substantially the same as the configuration of the first control device 21. The operations of the second control device 22 are substantially the same as the operations of the first control device 21.

The communicator 81 is connected to the first network 31 and communicates with the other devices such as the first gateway 41, the first client device 51, the first protection device 61, etc., via the first network 31. Also, the communicator 81 communicates with the second control device 22 via the first network 31, the first gateway 41, the third network 33, and the second gateway 42.

The controller 82 is connected to the communicator 81 and the first AC-DC converter 11. Data that is transmitted from the other devices via the first network 31 and the communicator 81 is input to the controller 82. For example, the direct current power command values and/or the operation mode switch signal from the first client device 51, the protection request signal from the first protection device 61, etc., are input to the controller 82.

Also, as described above, various data such as the actual measured values of the current/voltage, etc., are input from the first AC-DC converter 11 to the controller 82. Based on the devices connected via the first network 31 and the data input from the first AC-DC converter 11, the controller 82 generates control pulses and controls the conversion of the electrical power by the first AC-DC converter 11. For example, the controller 82 outputs the control pulses to the first AC-DC converter 11 via an optical cable.

The controller 82 includes a data acquirer 83 and a data updater 84. The data acquirer 83 acquires various data necessary to control the first control device 21 and the first AC-DC converter 11. The data acquirer 83 acquires the various data input from the other devices via the signal line 21a and/or the first network 31. The data that is acquired by the data acquirer 83 is not limited to the data input from the other devices and may be data input from other components of the first control device 21, data generated inside the controller 82, etc. The acquisition of the data by the data acquirer 83 may include, for example, the generation of data by data processing.

The data acquirer 83 includes a memory part 83a. The data acquirer 83 stores the various acquired data in the memory part 83a. The memory part 83a includes, for example, multiple data buffers provided for each item of the acquired data. When the data acquirer 83 acquires the data, the data acquirer 83 updates the information of the data buffers by writing the acquired data into the corresponding data buffer. The controller 82 performs the generation of the control pulses, etc., based on the data stored in each data buffer.

Each time new data is acquired, the data acquirer 83 and the memory part 83a may erase the old data or may sequentially store the old data without erasing. It is sufficient for the memory part 83a to store at least the newest data necessary for the control.

The controller 82 is, for example, a microprocessor unit including an internal memory. The memory part 83a may be provided separately from the controller 82. For example, the controller 82 may store the data in a memory part connected via a signal line, etc.

The data acquirer 83 includes data constantly having a possibility of the value and/or the state changing and data not changing except at designated timing such as when an abnormality occurs, when switching modes, etc. Among the data acquired by the data acquirer 83, for example, the direct current power command values, the actual measured values of the current/voltage of the components, the calculation results of the controller 82, etc., are data constantly having a possibility of the value and/or the state changing. On the other hand, among the data acquired by the data acquirer 83, for example, the protection request signal, the operation mode switch signal, etc., are data not changing except at designated timing such as when an abnormality occurs, when switching modes, etc.

The interval of the acquisition of the data constantly having a possibility of the value and/or the state changing may be the same or may be different between the data. The data acquirer 83 acquires data of at least one item at a first interval S1. In the case where the data acquirer 83 acquires data of multiple items at a constant interval, the first interval S1 is, for example, an interval set for satisfying the control responsiveness required by the high voltage direct current power transmission system 10.

The first control device 21 that conforms to the IEC 61850 standard includes a transmission function of the GOOSE signal. The first control device 21 includes a GOOSE-transmission data set 86 (a data set). The GOOSE-transmission data set 86 includes, for example, data of multiple items such as the direct current power command values, the protection request signal, the operation mode switch signal, the calculation results of the controller 82, etc. For example, the GOOSE signal is transmitted to the other devices as one packet including each of these data, etc. The GOOSE-transmission data set 86 is not limited to that recited above and may include, for example, a voltage command value, a current command value, a failure signal, etc.

The number of data items included in the GOOSE-transmission data set 86 may be one. It is sufficient for the GOOSE-transmission data set 86 to include the data of at least one item. For example, the GOOSE-transmission data set 86 is stored in the memory part 83a inside the controller 82 or in a dedicated data buffer for GOOSE signal transmission provided in a memory part provided externally to the controller 82, etc.

The data updater 84 updates the GOOSE-transmission data set 86. The data updater 84 updates the GOOSE-transmission data set 86 to have the newest data acquired by the data acquirer 83. In the case where the value or the state has changed for even one of the items included in the GOOSE-transmission data set 86 updated by the data updater 84, the GOOSE-transmission data set 86 including the data after the updating is transmitted to the other devices from the communicator 81 as the GOOSE signal.

The GOOSE signal is a multicast method of communication. Accordingly, the controller 82 transmits the GOOSE signal to one or multiple pre-designated nodes of the multiple nodes connected to the first network 31. For example, the controller 82 transmits the GOOSE signal to each of the first gateway 41, the first client device 51, and the first protection device 61 connected to the first network 31. The first gateway 41 transmits the GOOSE signal to the second control device 22 via the third network 33 and the second gateway 42.

For example, when receiving the GOOSE signal from the first control device 21, the second control device 22 controls the operations of the second AC-DC converter 12 according to the data included in the GOOSE signal. For example, the second control device 22 switches the operation mode of the second AC-DC converter 12 according to the operation mode switch signal included in the GOOSE signal. For example, the second control device 22 stops the operation of the second AC-DC converter 12 in the case where the stop of the operation is instructed by the protection request signal included in the GOOSE signal.

The data updater 84 updates the data of the GOOSE-transmission data set 86 at a second interval S2 that is slower than the first interval S1.

For example, the data updater 84 updates the data of the GOOSE-transmission data set 86 at the second interval S2 in which one interval is set to be when the acquisition of the data of the at least one item acquired at the first interval S1 is performed a prescribed number of times by the data acquirer 83.

For example, the data updater 84 counts the number of times of acquiring the data acquired at the first interval S1. In the case where the count does not satisfy the prescribed number of times, the update of the data of the GOOSE-transmission data set 86 is not performed; and only the data of the data buffers of the memory part 83a is updated. Also, even in the case where the count does not satisfy the prescribed number of times, the data of the corresponding data buffer of the memory part 83a is updated according to the acquisition of the data.

Then, for example, in the case where the count has reached the prescribed number of times, the data updater 84 extracts the data corresponding to the GOOSE-transmission data set 86 from each data buffer of the memory part 83a and writes the data to the GOOSE-transmission data set 86. Thereby, the data updater 84 updates the GOOSE-transmission data set 86 each time the acquisition of the data is performed the prescribed number of times. In other words, the data updater 84 thins out the data acquired by the data acquirer 83 by the amount of the prescribed number of times.

Thus, the data updater 84 performs the update of the data of the GOOSE-transmission data set 86 at the second interval S2 that is slower than the first interval S1 by setting the second interval S2 of the update of the GOOSE-transmission data set 86 to be the first interval S1 of the acquisition of the data×a times, wherein the prescribed number of times is a times.

As recited above, in the writing method of the data stored in each data buffer of the memory part 83a into the GOOSE-transmission data set 86, for example, the data that is acquired is written to the GOOSE-transmission data set 86 at the point in time when the count reaches the prescribed number of times. For example, for the numerical data such as the actual measured values of the current/voltage of the components, etc., the average value of the data acquired until the count reaches the prescribed number of times may be written to the GOOSE-transmission data set 86.

Figure 3:
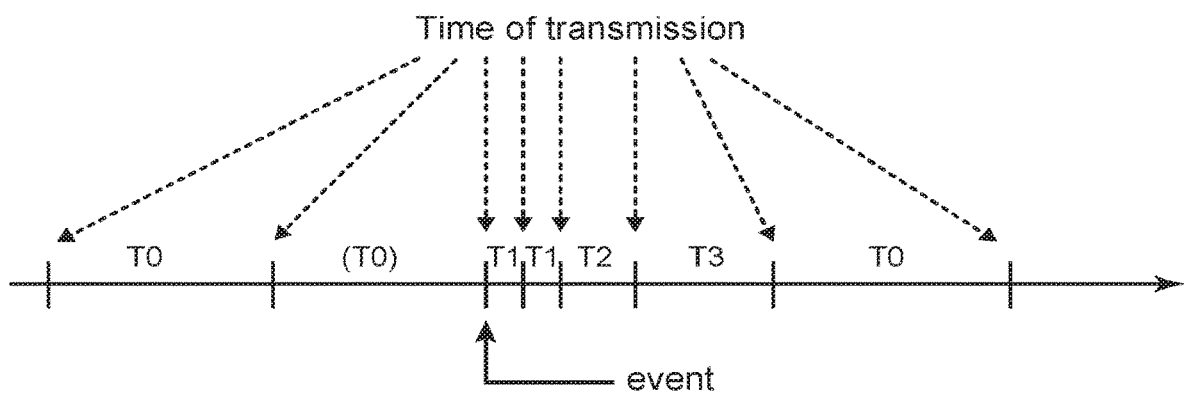
FIG. 3 is a graph schematically illustrating an overview of the GOOSE transmission function of the IEC 61850 standard.

FIG. 3 is a graph schematically illustrating an overview of the GOOSE transmission function of the IEC 61850 standard. FIG. 3 is taken from the IEC 61850 standard.

The GOOSE signal is transmitted at the timing shown by the arrows in FIG. 3. The GOOSE signal is transmitted when a state change (an event) occurs in the data included in the GOOSE signal. Thereafter, in the case where an event does not occur, the GOOSE signal is transmitted two times using the interval of T1. Then, subsequently, the transmission is performed at the timing of T1×2, T1×2×2, T1×2×2×2, . . . ; and the longest transmission interval is T0. Thereafter, in the case where an event does not occur, the GOOSE signal is transmitted by constantly using the T0 interval. In FIG. 3, "T1×2" is illustrated as "T2;" and "T1×2×2" is illustrated as "T3."

In FIG. 3, it is possible to set T0 and T1 for each of the devices. In the case where T1=100 ms and T0=1.0 s are set, the GOOSE signal is transmitted when an event occurs; thereafter, if no event occurs in the corresponding data, the GOOSE signal is transmitted in the order of after 100 ms, after 100 ms, after 200 ms, after 400 ms, after 800 ms, after 1.0 s, after 1.0 s, . . . .

In the first control device 21 of the high voltage direct current power transmission system 10, the memory part 83a (e.g., the memory inside the microprocessor unit) inside the device is updated by performing high-speed calculation processing by the controller 82. Also, although the first control device 21 performs communication of the GOOSE signal with the other devices, there are items included in the data for which the communication is performed by the GOOSE signal for which the GOOSE transmission interval requested from the high voltage direct current power transmission system 10 has a sufficiently low rate compared to the calculation interval inside the first control device 21. In such a first control device 21, the data of the GOOSE-transmission data set 86 is updated every calculation interval inside the first control device 21; further, in the case where the data of the GOOSE-transmission data set 86 changes at the short interval, the GOOSE signal undesirably continues to be transmitted at an interval shorter than that required by the high voltage direct current power transmission system 10 (a shorter interval than necessary).

Thereby, in the other devices connected to the first control device 21, the number of times the GOOSE signal is received from the first control device 21 increases; and there is a possibility that the processing may become overloaded due to the reception processing of the GOOSE signal. Further, there is also a possibility that the communication load inside the first network 31 may become excessive. In particular, because the GOOSE signal is transmitted by a multicast method, the GOOSE signal is received even by devices in which the data is not always necessary; and unnecessary reception processing and/or the communication load are increased undesirably.

Conversely, in the first control device 21 of the high voltage direct current power transmission system 10 according to the embodiment, the data acquirer 83 acquires the data of the at least one item at the first interval S1; and the data updater 84 performs the update of the data of the GOOSE-transmission data set 86 at the second interval S2 that is slower than the first interval S1 or at a frequency less than the second interval S2.

In other words, the data processing relating to the control responsiveness of the first control device 21 is performed at the first interval S1; and the update of the GOOSE-transmission data set 86 is performed at a low interval appropriate for the communication interval. Thereby, even in the case where the signal of which the state constantly changes (e.g., the control values calculated by the devices) is included in the GOOSE signal, the GOOSE signal can be transmitted at the optimal frequency after ensuring the control responsiveness of the first control device 21. As a result, the excessive communication load inside the first network 31 and/or signal reception processing of the receiving-side devices can be suppressed.

For example, the data updater 84 performs the update of the data of the GOOSE-transmission data set 86 at the second interval S2 that is slower than the first interval S1 by setting the second interval S2 of the update of the GOOSE-transmission data set 86 to be the first interval S1 of the acquisition of the data×a times. For example, a times which is the prescribed number of times is determined to be not less than the "interval required by the system" and not more than the "interval limit due to the processing capability of the other devices connected to the network." In other words, the second interval S2 is determined to be not less than the "interval required by the system" and not more than the "interval limit due to the processing capability of the other devices connected to the network."

Thereby, the GOOSE signal can be transmitted at an interval appropriate for the communication interval required by the system using the devices. For example, the shortest transmission interval of the GOOSE signal can be set to S1×a. In other words, the "interval limited due to the processing capability of the other devices connected to the network" is the "interval necessary for the control responsiveness of the other devices." a times which is the prescribed number of times is, for example, about five times.

Figure 4:
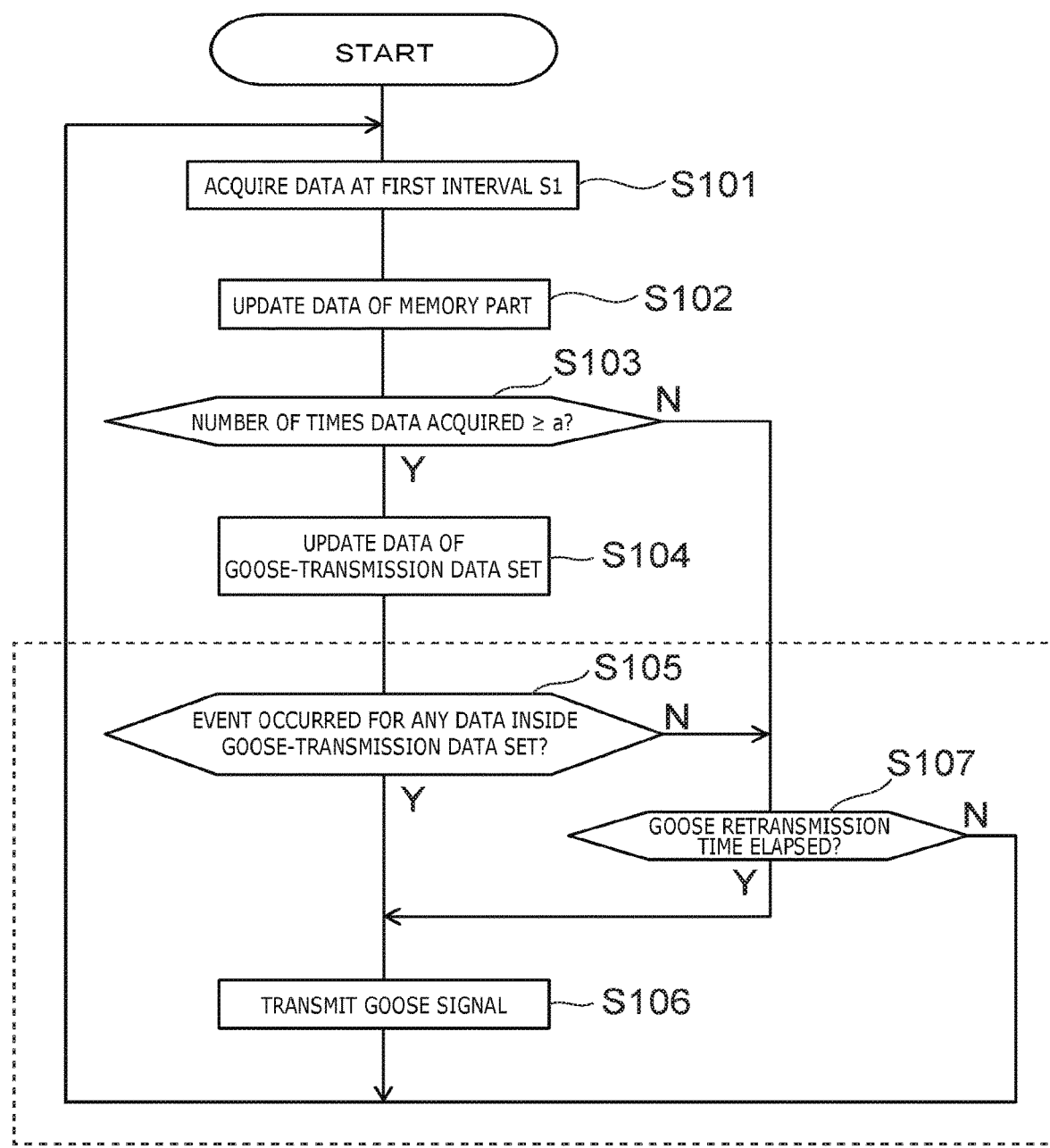
FIG. 4 is a flowchart schematically illustrating an example of the operations of the first control device according to the first embodiment.

FIG. 4 is a flowchart schematically illustrating an example of the operations of the first control device according to the first embodiment.

FIG. 4 schematically illustrates a portion of the operations of the first control device 21. FIG. 4 schematically illustrates an example of the data transmission method of the first control device 21.

In the controller 82 of the first control device 21 as illustrated in FIG. 4, the data acquirer 83 acquires the data of at least one item at the first interval S1 (step S101 of FIG. 4).

When the data is acquired by the data acquirer 83, the controller 82 updates the data of the data buffers of the memory part 83a to the new acquired data (step S102 of FIG. 4). In the case where the data of multiple items is acquired at the first interval S1, the controller 82 updates the data of the data buffer of each of the items of the memory part 83a. Further, it is determined whether or not the number of times of acquiring the data has reached a times which is the prescribed number of times (step S103 of FIG. 4).

In the case where the number of times of acquiring the data has reached a times which is the prescribed number of times, the data updater 84 updates the data of the GOOSE-transmission data set 86 (step S104 of FIG. 4).

When the data of the GOOSE-transmission data set 86 is updated, the controller 82 determines whether or not any of the data items included in the GOOSE-transmission data set 86 including the data after the updating has changed from the update of the previous time (step S105 of FIG. 4).

In the case where any of the data items included in the GOOSE-transmission data set 86 has changed from the update of the previous time, a packet that includes the GOOSE-transmission data set 86 is transmitted as the GOOSE signal from the communicator 81 to the other devices (step S106 of FIG. 4).

Further, it is determined whether or not the GOOSE retransmission time has elapsed (step S107 of FIG. 4) in the case where the number of times of acquiring the data has not reached a times which is the prescribed number of times in step S103 of FIG. 4 or in the case where none of the data items included in the GOOSE-transmission data set 86 have changed from the update of the previous time in step S105 of FIG. 4.

In the case where none of the data items included in the GOOSE-transmission data set 86 change until the GOOSE retransmission time has elapsed, the packet that includes the GOOSE-transmission data set 86 is transmitted as the GOOSE signal from the communicator 81 to the other devices (step S106 of FIG. 4).

Figure 7:
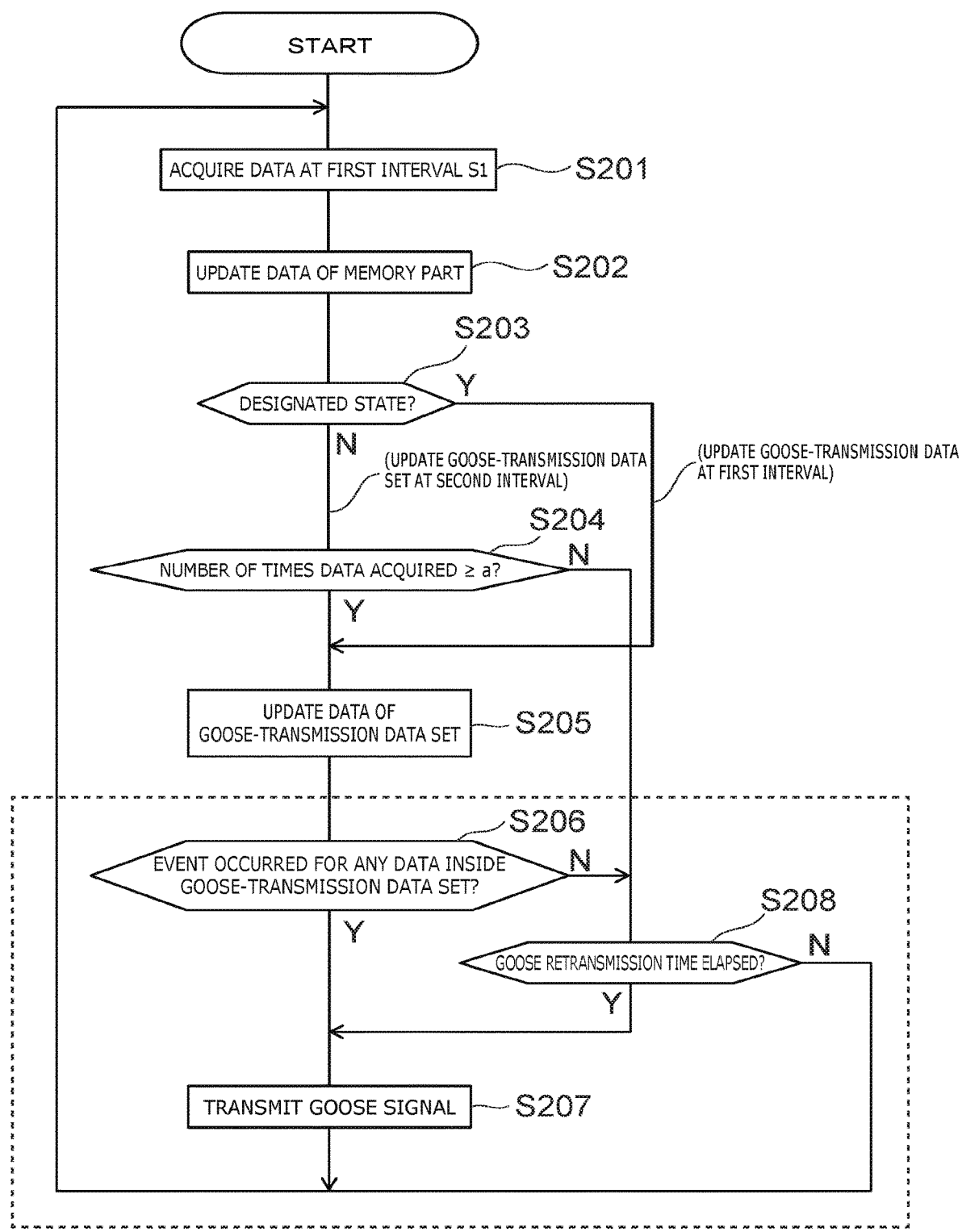
FIG. 7 is a flowchart schematically illustrating an example of the operations of the first control device according to the second embodiment.

On the other hand, in the case where the interval in which none of the data items included in the GOOSE-transmission data set 86 have changed does not satisfy the GOOSE retransmission time, the communicator 81 does not perform the transmission of the GOOSE signal. Steps S105 to S107 of FIG. 4 described above are the GOOSE transmission function specified by IEC 61850. For example, the GOOSE retransmission time in step S107 of FIG. 7 is set for the other devices of the high voltage direct current power transmission system 10 as a tolerable time from the occurrence of a failure in the reception of the GOOSE signal until the device re-receives.

Thereby, as described above, the GOOSE signal can be transmitted at an interval appropriate for the communication interval required by the system; and the excessive communication load and/or signal reception processing can be suppressed.

Thus, according to the first control device 21 and the data transmission method of the first control device 21 according to the embodiment, the transmission of the data at a higher frequency than necessary can be suppressed.

Figure 5:
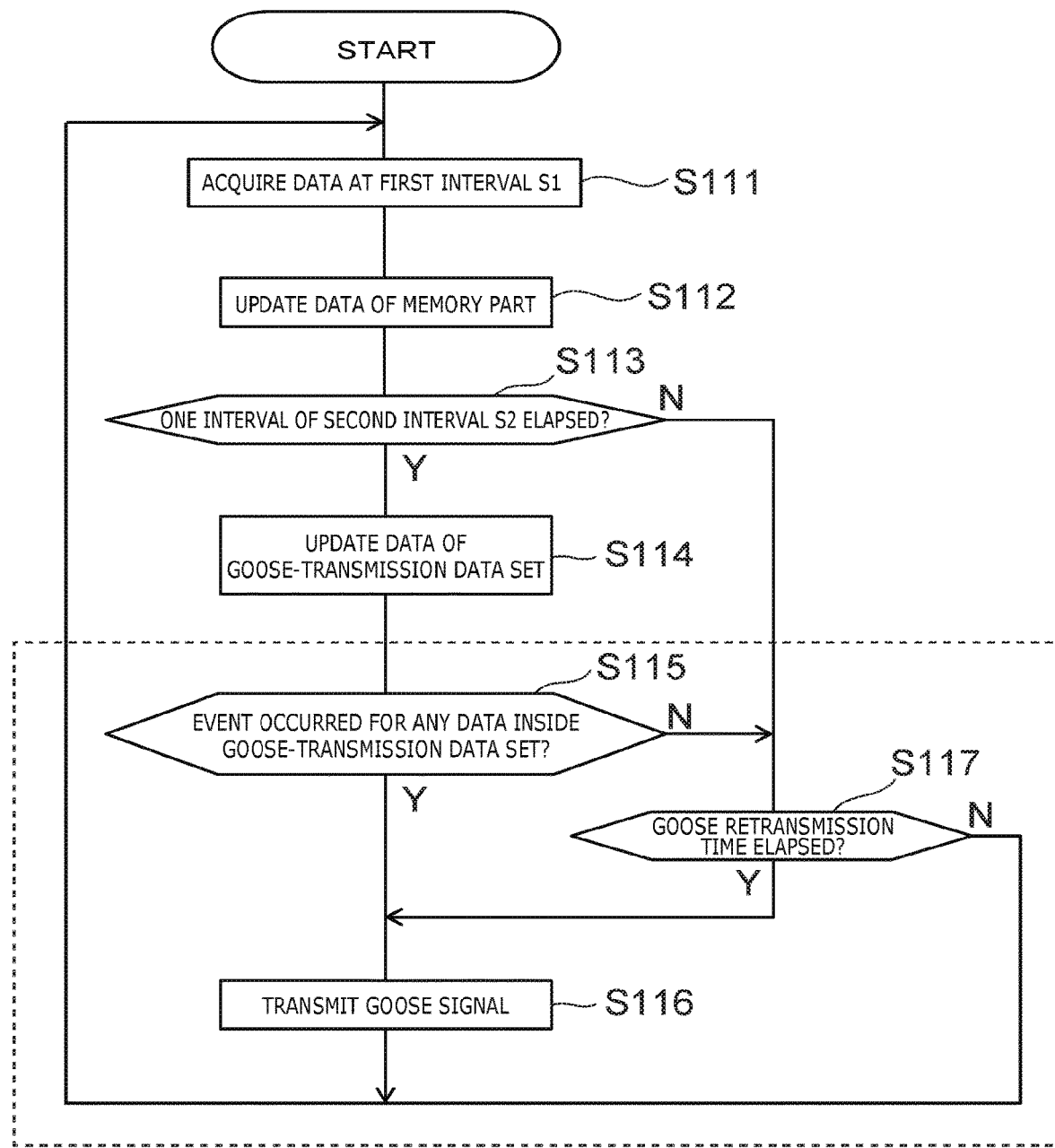
FIG. 5 is a flowchart schematically illustrating another example of the operations of the first control device according to the first embodiment.

FIG. 5 is a flowchart schematically illustrating another example of the operations of the first control device according to the first embodiment.

FIG. 5 schematically illustrates another example of the data transmission method of the first control device 21.

In the example as illustrated in FIG. 5 as well, first, the data acquirer 83 acquires the data of at least one item at the first interval S1 (step S111 of FIG. 5).

When the data is acquired by the data acquirer 83, the controller 82 updates the data of the data buffers of the memory part 83a to the new acquired data (step S112 of FIG. 5). In the case where the controller 82 acquires data of multiple items at the first interval S1, the data of the data buffer of each of the items of the memory part 83a is updated. Subsequently, the controller 82 determines whether or not one interval of the second interval S2 has elapsed (step S113 of FIG. 5). Thus, in the example, the controller 82 includes the second interval S2 that is independent of (asynchronous with) the first interval S1.

In the case where one interval of the second interval S2 has elapsed, the data updater 84 updates the data of the GOOSE-transmission data set 86 (step S114 of FIG. 5).

Steps S115 to S117 of FIG. 5 are the GOOSE transmission function specified by IEC 61850 and are substantially the same as steps S105 to S107 of FIG. 4 described in reference to the embodiment of FIG. 4 recited above; and a detailed description is therefore omitted.

Thus, in the data transmission method using the second interval S2 that is independent of (asynchronous with) the first interval S1 as well, similarly to the example shown in FIG. 4, the GOOSE signal can be transmitted at an interval appropriate for the communication interval required by the system; and the excessive communication load and/or signal reception processing can be suppressed.

In the method shown in FIG. 4, it is necessary to set the second interval S2 to be an integer multiple of the first interval S1. Conversely, the data of the GOOSE-transmission data set 86 can be updated using, of course, the second interval S2 independent of (asynchronous with) the first interval S1 but also by using a timing unrelated to the first interval S1. Thereby, for example, compared to the method shown in FIG. 4, the flexibility of the design can be increased further.

Second Embodiment

Figure 6:
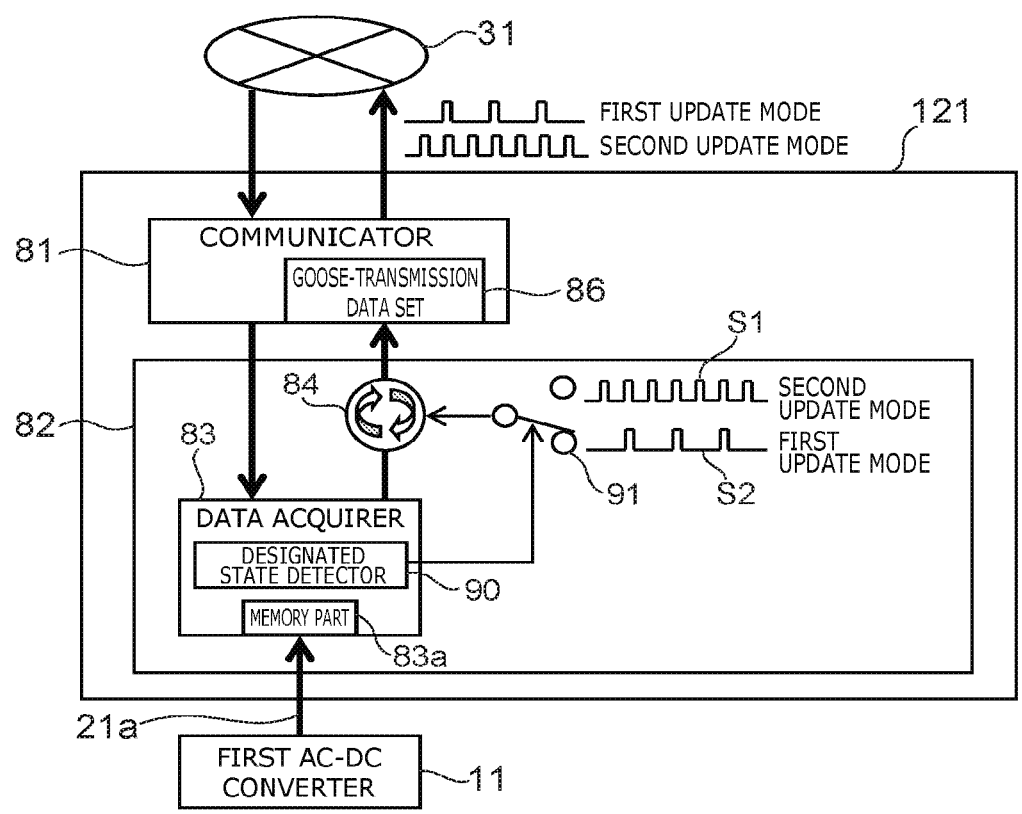
FIG. 6 is a block diagram schematically illustrating a first control device according to a second embodiment.

FIG. 6 is a block diagram schematically illustrating a first control device according to a second embodiment.

In the first control device 121 as illustrated in FIG. 6, the controller 82 further includes a designated state detector 90 and a mode switcher 91. Components that are substantially the same functionally and configurationally as those of the first embodiment recited above are marked with the same reference numerals; and a detailed description is omitted.

In the example, the data updater 84 of the controller 82 includes a first update mode and a second update mode. As described in the first embodiment recited above, the first update mode is a mode in which the update of the data of the GOOSE-transmission data set 86 is performed at the second interval S2. The second update mode is a mode in which the update of the data of the GOOSE-transmission data set 86 is performed at the first interval S1. In other words, the second update mode is a mode in which the update of the data of the GOOSE-transmission data set 86 is performed at substantially the same interval as the acquisition of the data by the data acquirer 83.

The designated state detector 90 detects the designated state and inputs the detection result to the mode switcher 91. The designated state is, for example, a state in which a responsiveness that is higher than that of the steady state is required. More specifically, the designated state is, for example, a condition generating overcurrent/overvoltage in the system, the modification interval of the operation mode, etc., and refers to a state in which it is necessary to restore urgently to the original state. The steady state is, for example, a state in which the entire high voltage direct current power transmission system 10 is within the appropriate operating ranges.

For example, the designated state detector 90 detects the designated state based on the data acquired by the data acquirer 83. For example, the designated state detector 90 sets an abrupt change of the calculation result of the current command value, an abrupt change of the measured value of the current, the voltage, or the like, the realization of the protection request signal and/or the operation mode switch signal, etc., to be designated conditions, and detects the designated state in the case where these designated conditions are realized.

In the case where the designated state is not detected by the designated state detector 90, that is, in the steady state, the mode switcher 91 sets the update mode of the data updater 84 to the first update mode. Then, in the case where the designated state is detected by the designated state detector 90, the mode switcher 91 switches the update mode of the data updater 84 from the first update mode to the second update mode. Also, in the case where the detection result of the designated state detector 90 is switched from the detection state to the nondetection state of the designated state, the mode switcher 91 returns the update mode of the data updater 84 from the second update mode to the first update mode.

As described in the first embodiment recited above, in the case where the first update mode is set by the mode switcher 91, the data updater 84 performs the update of the data of the GOOSE-transmission data set 86 at the second interval S2. On the other hand, in the case where the mode switcher 91 switches the first update mode to the second update mode, the data updater 84 performs the update of the data of the GOOSE-transmission data set 86 at the first interval S1.

FIG. 7 is a flowchart schematically illustrating an example of the operations of the first control device according to the second embodiment.

FIG. 7 schematically illustrates an example of the data transmission method of the first control device 121.

In the example as illustrated in FIG. 7 as well, first, the data acquirer 83 acquires the data of at least one item at the first interval S1 (step S201 of FIG. 7).

When the data is acquired by the data acquirer 83, the controller 82 updates the data of the data buffers of the memory part 83a to the new acquired data (step S202 of FIG. 7). In the case where the data of multiple items is acquired at the first interval S1, the controller 82 updates the data of the data buffer of each of the items of the memory part 83a.

When the data is acquired by the data acquirer 83, the designated state is detected based on the data acquired by the designated state detector 90 (step S203 of FIG. 7).

In the case where the designated condition is not detected by the designated state detector 90 (in the steady state), the first update mode is set by the mode switcher 91; and the data updater 84 performs the update of the data of the GOOSE-transmission data set 86 at the second interval S2 (steps S204 to S205 of FIG. 7). Thereby, in the first update mode, the update of the data included in the GOOSE-transmission data set 86 is performed at the second interval S2.

On the other hand, in the case where the designated state is detected by the designated state detector 90, the second update mode is set by the mode switcher 91; and the data updater 84 performs the update of the data of the GOOSE-transmission data set 86 at the first interval S1 (step S205 of FIG. 7). Thereby, in the second update mode, the update of the data included in the GOOSE-transmission data set 86 is performed at the first interval S1.

Steps S206 to S208 of FIG. 7 are the GOOSE transmission function specified in IEC 61850 and are substantially the same as steps S103 to S107 of FIG. 4 described in reference to the first embodiment recited above; and a detailed description is therefore omitted. Although the second interval S2 of FIG. 7 has a form such that the second interval S2 of FIG. 4 is a multiplied by the first interval S1, a form may be used in which a second interval S is independent of the first interval S1 of FIG. 5.

Thus, in the first control device 121 according to the embodiment, the first update mode is used when steady. Therefore, even in the case where the acquisition of the data is performed at the first interval S1, the data of the GOOSE-transmission data set 86 is updated every second interval S2; and the shortest transmission interval of the GOOSE signal also is the second interval S2. As a result, the transmission frequency of the GOOSE signal is lower than that of the second update mode; the communication load of the first network 31 can be reduced; and the load of the signal reception processing of the devices connected to the first network 31 can be reduced.

On the other hand, by switching from the first update mode to the second update mode in the designated state requiring the high responsiveness, the data of the GOOSE-transmission data set 86 is updated at the first interval S1 which is the shortest interval. Therefore, in the second update mode, the shortest update interval of the GOOSE signal is the first interval S1. Accordingly, in the second update mode, the transmission frequency of the GOOSE signal is higher than that of the first update mode; and although the communication load becomes large temporarily in the interval in which the designated state is detected, the responsiveness of the entire system can be increased by increasing the communication interval.

Thus, in the first control device 121 according to the embodiment, the communication load when steady can be reduced; and the control responsiveness of the entire system when detecting the designated condition can be increased. For example, the restoration of the high voltage direct current power transmission system 10 from the transient state can be faster.

Third Embodiment

Figure 8:
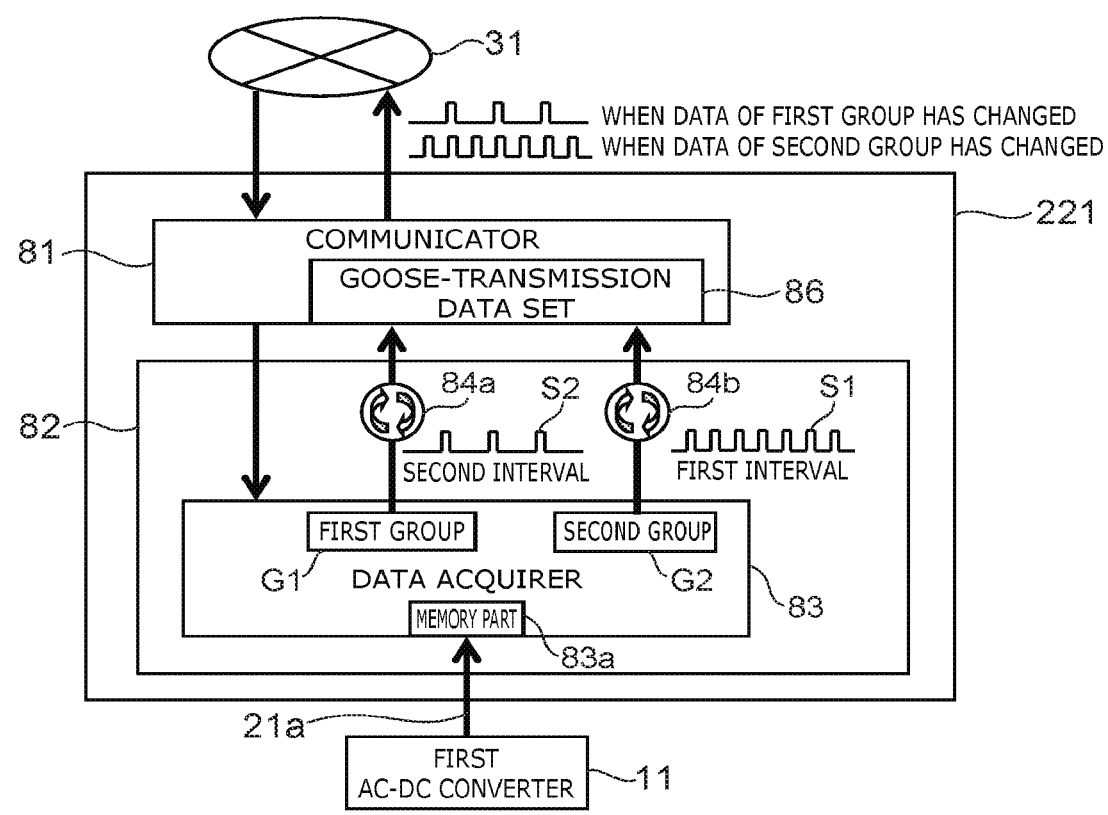
FIG. 8 is a block diagram schematically illustrating a first control device according to a third embodiment.

FIG. 8 is a block diagram schematically illustrating a first control device according to a third embodiment.

In the first control device 221 as illustrated in FIG. 8, the controller 82 includes a first data updater 84a and a second data updater 84b. Also, in the first control device 221, the GOOSE-transmission data set 86 includes data of multiple items. The multiple items include a first group G1 in which the data is acquired regularly, and a second group G2 in which the data is acquired irregularly. The first group G1 includes, for example, the direct current power command values, the calculation results of the controller 82, etc. The second group G2 includes, for example, the protection request signal, the operation mode switch signal, etc.

The data acquirer 83 acquires the data of at least one item of the first group G1 and the second group G2 at the first interval S1.

When acquiring the data at the first interval S1, the first data updater 84a updates the data of the items of the first group G1 of the data items of the GOOSE-transmission data set 86 at the second interval S2. Thereby, in the case where only the data of the items of the first group G1 constantly changes and the data of the items of the second group G2 does not change, the GOOSE signal is transmitted at the second interval S2.

As the data acquisition is performed at the first interval S1, the second data updater 84b updates the data of the items of the second group G2 of the data items of the GOOSE-transmission data set 86 at the first interval S1. Thereby, in the case where an event occurs in the data of the items of the second group G2, the GOOSE signal is transmitted simultaneously with the data acquisition at the first interval S1.

Figure 9:
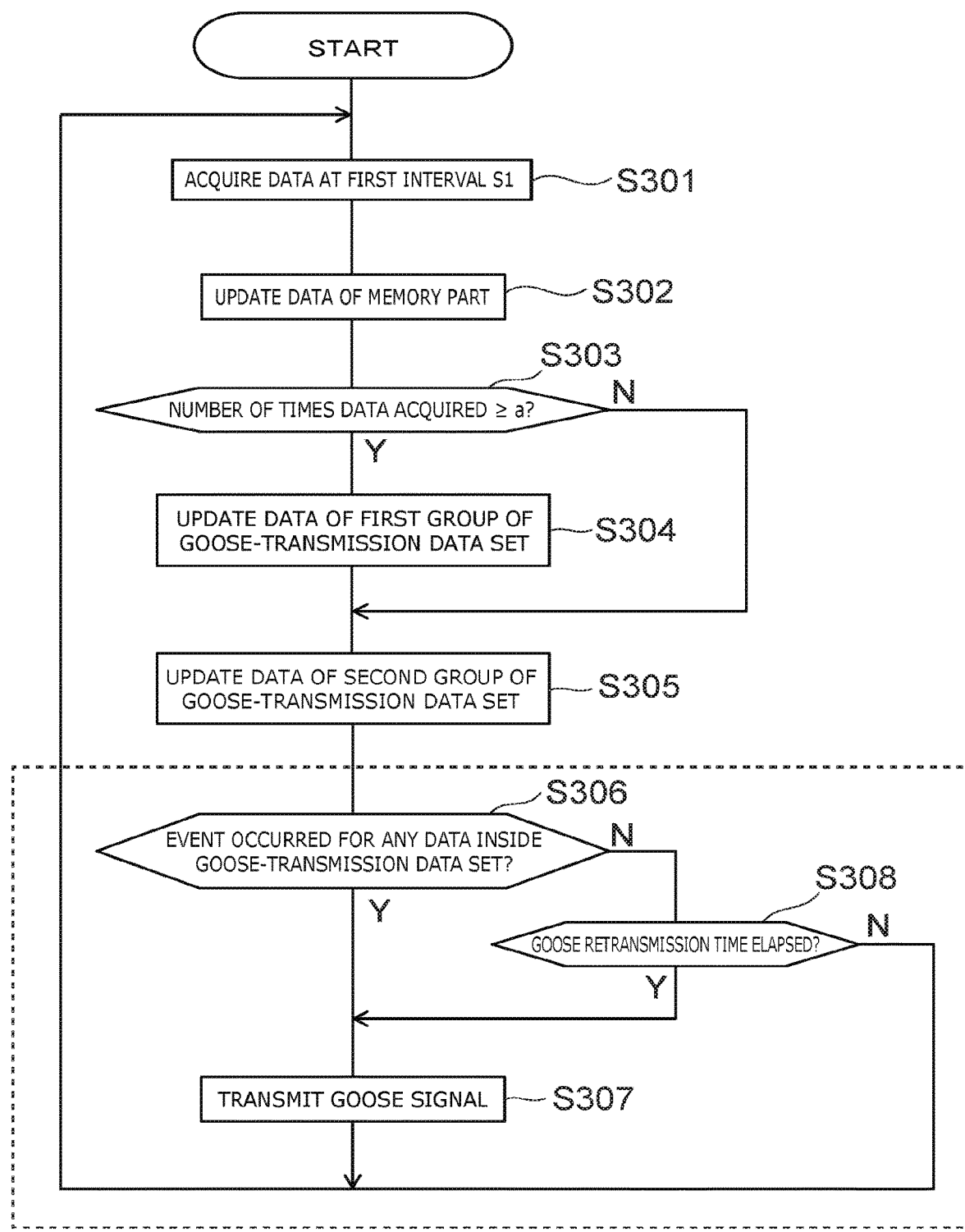
FIG. 9 is a flowchart schematically illustrating an example of the operations of the first control device according to the third embodiment.

FIG. 9 is a flowchart schematically illustrating an example of the operations of the first control device according to the third embodiment.

FIG. 9 schematically illustrates an example of the data transmission method of the first control device 221.

In the data transmission method of the first control device 221 as illustrated in FIG. 9, first, the data acquirer 83 acquires the data of at least one item at the first interval S1 (step S301 of FIG. 9).

When the data is acquired by the data acquirer 83, the controller 82 updates the data of the data buffers of the memory part 83a to the new acquired data (step S302 of FIG. 9). In the case where the data of the multiple items is acquired at the first interval S1, the controller 82 updates the data of the data buffer of each of the items of the memory part 83a. Further, it is determined whether or not the number of times of acquiring the data has reached a times which is the prescribed number of times (step S303 of FIG. 9).

In the case where the number of times of acquiring the data has reached a times which is the prescribed number of times, the data updaters 84a and 84b update the data of the first group G1 and the second group G2 of the GOOSE-transmission data set 86 (steps S304 and S305 of FIG. 9). On the other hand, in the case where the number of times of acquiring the data does not satisfy a times which is the prescribed number of times, the data updater 84b updates only the data of the second group G2 of the GOOSE-transmission data set 86 (step S305 of FIG. 9).

Steps S306 to S308 of FIG. 9 are the GOOSE transmission function specified in IEC 61850 and are substantially the same as steps S105 to S107 of FIG. 4 described in reference to the first embodiment recited above; and a detailed description is therefore omitted. Although the form of the second interval S2 of FIG. 9 is such that the second interval S2 of FIG. 4 is a multiplied by the first interval S1, a form may be used in which the second interval S is independent of the first interval S1 of FIG. 5.

Thus, in the first control device 221 according to the embodiment, the data items included in the first group G1 of the data included in the GOOSE-transmission data set 86 are updated every second interval S2. On the other hand, the data items included in the second group G2 of the data included in the GOOSE-transmission data set 86 are updated every first interval S1. For example, by setting data of which the value constantly changes and/or data not affecting the control responsiveness greatly to be in the first group G1, even in the case where the data of the data buffers of the memory part 83a changes, the update of the data of the GOOSE-transmission data set 86 is performed at the second interval S2; therefore, the transmission frequency of the GOOSE signal is low; the communication load of the first network 31 can be reduced; and the signal reception processing of the other devices can be reduced.

Also, in the first control device 221 according to the embodiment, for example, by setting data that changes only when abnormal, data that changes only when changing the operation mode, etc., to be in the second group G2, the update of the data of the GOOSE-transmission data set 86 is performed as the data is acquired; it is possible to transmit the GOOSE signal with a low delay time; and the responsiveness of the system can be improved while reducing the communication load of the first network 31.

Fourth Embodiment

Figure 10:
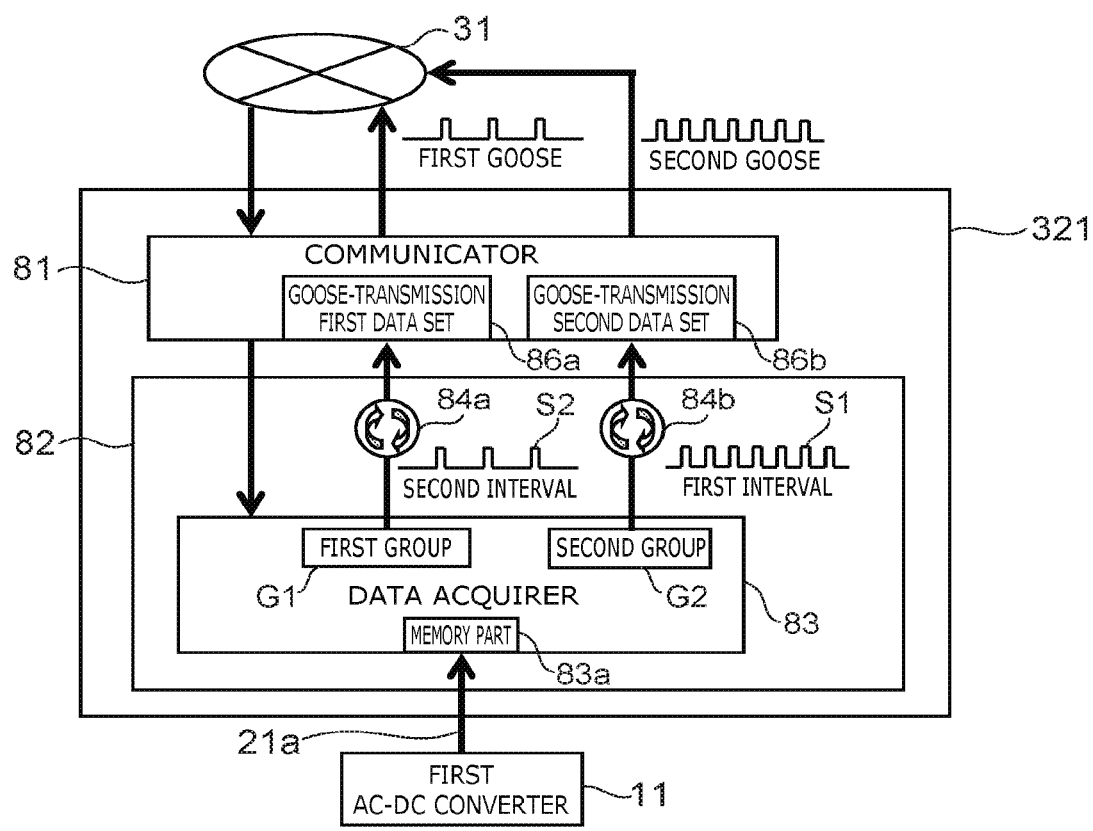
FIG. 10 is a block diagram schematically illustrating a first control device according to a fourth embodiment.

FIG. 10 is a block diagram schematically illustrating a first control device according to a fourth embodiment.

As illustrated in FIG. 10, the first control device 321 includes a GOOSE-transmission first data set 86a (a first data set) and a GOOSE-transmission second data set 86b (a second data set). The GOOSE-transmission first data set 86a includes the data of the items of the first group G1 for which the data is acquired regularly. The GOOSE-transmission second data set 86b includes the data of the items of the second group G2 for which the data is acquired irregularly.

Also, the controller 82 includes a first GOOSE signal and a second GOOSE signal. The controller 82 transmits the first GOOSE signal to the other devices in the case where any of the data included in the GOOSE-transmission first data set 86a is updated. Then, the controller 82 transmits the second GOOSE signal to the other devices in the case where any of the data included in the GOOSE-transmission second data set 86b is updated.

The data acquirer 83 acquires the data of at least one item of the first group G1 and the second group G2 at the first interval S1.

When acquiring the data at the first interval S1, the first data updater 84a updates the data of the GOOSE-transmission first data set 86a at the second interval S2. Thereby, in the case where the data of the items of the first group G1 constantly changes, the first GOOSE signal is transmitted at the second interval S2.

As the data acquisition is performed at the first interval S1, the second data updater 84b updates the data of the GOOSE-transmission second data set 86b at the first interval S1. Thereby, in the case where an event occurs in the data of the items of the second group G2, the second GOOSE signal is transmitted simultaneously with the data acquisition at the first interval S1.

Figure 11:
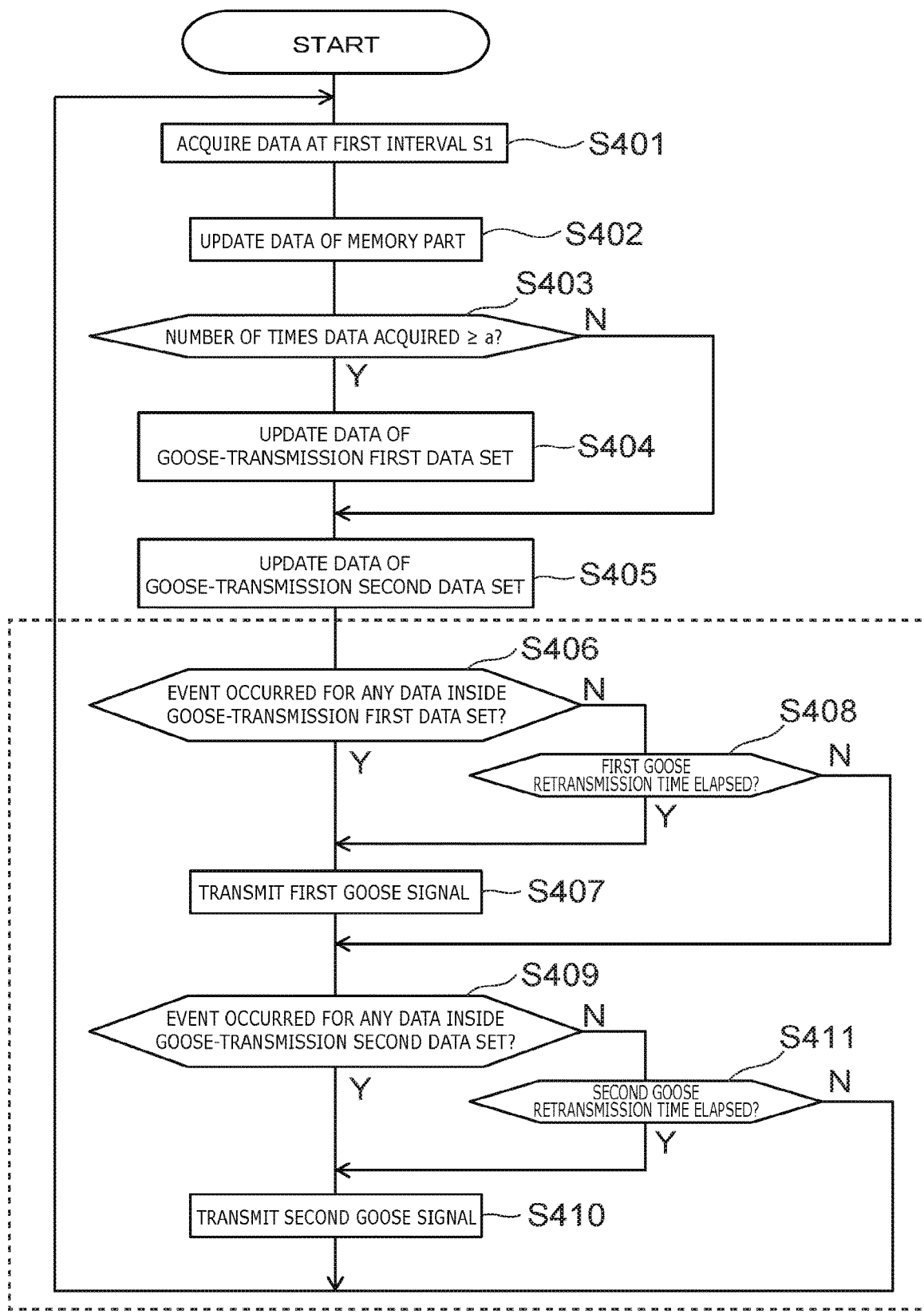
FIG. 11 is a flowchart schematically illustrating an example of the operations of the first control device according to the fourth embodiment.

FIG. 11 is a flowchart schematically illustrating an example of the operations of the first control device according to the fourth embodiment.

FIG. 11 schematically illustrates an example of the data transmission method of the first control device 321.

In the data transmission method of the first control device 321 as illustrated in FIG. 11, "update data of first group G1 of GOOSE-transmission data set" of step S304 of the flowchart shown in FIG. 9 is replaced with "update data of GOOSE-transmission first data set" in step S404. Also, "update data of second group G2 of the GOOSE-transmission data set" of step S305 of the flowchart shown in FIG. 9 is replaced with "update data of GOOSE-transmission second data set" in step S405.

"Event occurred for any data inside GOOSE-transmission data set" of step S306 of the flowchart shown in FIG. 9 is replaced with "event occurred for any data inside GOOSE-transmission first data set" in step S406.

"GOOSE retransmission time elapsed" of step S308 of the flowchart shown in FIG. 9 is replaced with "first GOOSE retransmission time elapsed" in step S408.

"Transmit GOOSE signal" of step S307 of the flowchart shown in FIG. 9 is replaced with "transmit first GOOSE signal" in step S407.

Also, steps S409 to S410 are added to the flowchart shown in FIG. 9. Steps S409 to S410 of FIG. 9 are the GOOSE transmission function specified in IEC 61850 and are substantially the same as steps S105 to S107 of FIG. 4 described in reference to the first embodiment recited above; and a detailed description is therefore omitted.

S406 to S408 are the transmission flow of the first GOOSE signal; and S409 to S410 each are the transmission flow of the second GOOSE signal. Although the first GOOSE signal and the second GOOSE signal differ in that the data sets that are transmitted are the GOOSE-transmission first data set and the GOOSE-transmission second data set, the GOOSE transmission flow itself that is specified in IEC 61850 is the same. However, the retransmission time of the first GOOSE signal and the retransmission time of the second GOOSE signal may be set to different values according to requested retransmission times for each signal. The other steps S401 to S403 are substantially the same as steps S301 to S303 of FIG. 9.

Thus, other than the points recited above, steps S401 to S410 of the data transmission method of the first control device 321 can be similar to steps S301 to S310 of the data transmission method of the first control device 221.

Thus, in the first control device 321 according to the embodiment, the GOOSE signal is divided into the first GOOSE signal and the second GOOSE signal. Thereby, for example, even in the case where events constantly occur for the data included in the first group G1, the transmission frequency of the first GOOSE signal can be suppressed; further, in the case where an event occurs for the data included in the second group G2, the second GOOSE signal can be transmitted with a low delay time. As a result, for example, the communication load of the first network 31 can be suppressed while maintaining a high control responsiveness for designated events; and the signal reception processing of the other devices can be reduced.

An example is shown in the embodiments recited above in which the invention is applied to the high voltage direct current power transmission system 10. The invention is not limited thereto and is applicable to, for example, a system of a frequency converter station, a system of a reactive power compensation device, a system of a solar power generation facility, a system of a wind power generation facility, etc.

In the embodiments recited above, the first control devices 21, 121, 221, and 321 of the first AC-DC converter 11 of the high voltage direct current power transmission system 10 are shown as the data transmission device. The data transmission device is not limited thereto and may be, for example, the first client device 51, the first protection device 61, etc. The data transmission device may be, for example, a control device of a converter of a frequency converter station or may be a power conditioner of a solar power generation facility or a wind power generation facility, etc.

The GOOSE transmission function of a device conforming to the IEC 61850 standard is described as an example in the embodiments recited above. The invention is not limited to the GOOSE transmission function and is applicable also to the communication of any other standard having a function of transmitting a signal according to an event occurring for designated data.

Hereinabove, embodiments of the invention are described with reference to specific examples. However, the embodiments of the invention are not limited to these specific examples. For example, one skilled in the art may similarly practice the invention by appropriately selecting specific configurations of components included in the data transmission device such as the communicator, the controller, etc., from known art; and such practice is within the scope of the invention to the extent that similar effects can be obtained.

Also, any two or more components of the specific examples may be combined within the extent of technical feasibility and are within the scope of the invention to the extent that the spirit of the invention is included.

Moreover, all data transmission devices and data transmission methods practicable by an appropriate design modification by one skilled in the art based on the data transmission devices and the data transmission methods described above as the embodiments of the invention also are within the scope of the invention to the extent that the spirit of the invention is included.

Moreover, various modifications and alterations within the spirit of the invention will be readily apparent to those skilled in the art; and all such modifications and alterations should be seen as being within the scope of the invention.

Although several embodiments of the invention are described, these embodiments are presented as examples and are not intended to limit the scope of the invention. These novel embodiments may be implemented in other various forms; and various omissions, substitutions, and modifications can be performed without departing from the spirit of the invention. Such embodiments and their modifications are within the scope and spirit of the invention and are included in the invention described in the claims and their equivalents.

The invention claimed is:

1. A data transmission device, comprising:
a communicator connected to a network, the communicator performing a communication with another device via the network; and
a controller configured to transmit, from the communicator to the other device, a data set including data of at least one item, the transmitting being performed in the case where the data of the at least one item is updated, the transmitted data set including the data after the updating,
wherein the controller is configured to acquire the data of the at least one item at a first interval, and perform the transmitting of the data set to the other device at a second interval or at a frequency less than the second interval by updating the data of the at least one item at the second interval, the second interval being slower than the first interval, and wherein the controller is configured to update the data of the at least one item, each time the acquiring of the data is performed, a prescribed number of times.

2. The data transmission device according to claim 1, wherein the controller includes:

a first update mode of performing an update of the data at the second interval; and a second update mode of performing an update of the data at the first interval, and the controller performs the update of the data in the first update mode in a steady state, and performs the update of the data in the second update mode in a designated state requiring a higher responsiveness than the steady state.

3. The data transmission device according to claim 1, wherein the data set includes data of a plurality of items, the plurality of items includes a first group and a second group, a state for the first group constantly having a possibility of changing, the data of the second group changing only for a designated condition, and the controller acquires data of at least one item of the first group at the first interval and updates the data of the data set at the second interval, and acquires data of at least one item of the second group at the first interval and updates the data of the data set at the first interval.

4. The data transmission device according to claim 1, wherein the controller controls the transmitting of a first data set and a second data set, the first data set includes data of an item of a first group, a state for the first group constantly having a possibility of changing, the second data set includes data of an item of a second group, the data of the second group changing only for a designated condition, the controller acquires data of at least one item of the first group at the first interval, and transmits the first data set at the second interval or at a frequency less than the second interval by updating the data of the item of the first group at the second interval, and the controller acquires data of at least one item of the second group at the first interval, and transmits the second data set at the first interval or at a frequency less than the first interval by updating the data of the item of the first group at the first interval.

5. The data transmission device according to claim 1, wherein the data set including data of at least one item is a GOOSE-transmission data set.

6. A data transmission device, comprising:

a communicator connected to a network, the communicator performing a communication with another device via the network; and a controller configured to transmit, from the communicator to the other device, a data set including data of at least one item, the transmitting being performed in the case where the data of the at least one item is updated, the transmitted data set including the data after the updating, wherein the controller is configured to acquire the data of the at least one item at a first interval, and perform the transmitting of the data set to the other device at a second interval or at a frequency less than the second interval by updating the data of the at least one item at the second interval, the second interval being slower than the first interval, and wherein the second interval of the controller is asynchronous with the first interval, and the controller updates the data of the at least one item each time one interval of the second interval has elapsed.

7. A data transmission method of a data transmission device, the data transmission device including: a communicator connected to a network, the communicator performing a communication with another device via the network, and a controller configured to transmit, from the communicator to the other device, a data set including data of at least one item, the transmitting being performed in the case where the data of the at least one item is updated, the transmitted data set including the data after the updating, the data transmission method comprising:

acquiring the data of the at least one item at a first interval; and performing the transmitting of the data set to the other device at a second interval or at a frequency less than the second interval by updating the data of the at least one item at the second interval, the second interval being slower than the first interval, wherein the updating the data of the at least one item is performed, each time the acquiring of the data is performed, a prescribed number of times.

* * * * *